Figure 1:
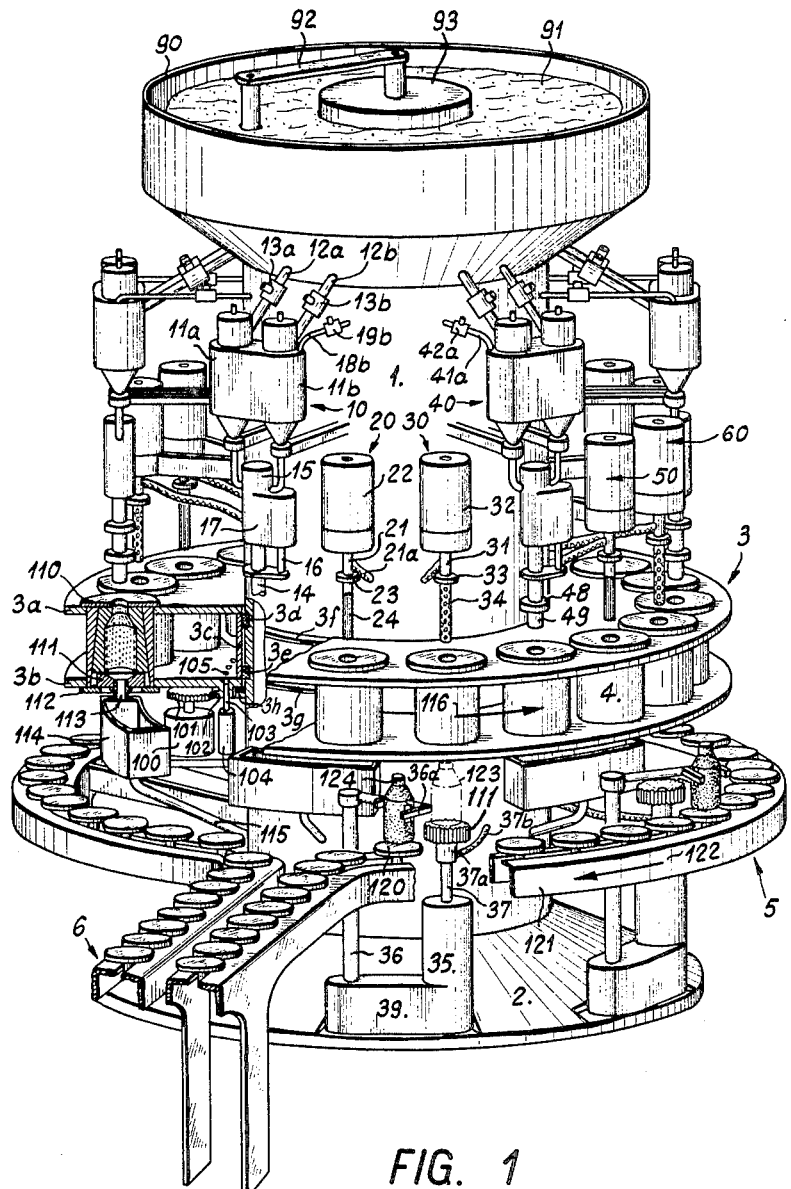

United States Patent Office 3,235,445
Patented Feb. 15, 1966

3,235,445
AUTOMATIC MOULDING MACHINE FOR PAPER
PULP ARTICLES
Kurt Hugentobler, Onex, Geneva, Switzerland, assignor
to Georges Lesieur & ses Fils, Paris, France, a firm
Filed July 3, 1963, Ser. No. 292,676
Claims priority, application Switzerland, July 4, 1962,
8,041/62
18 Claims. (Cl. 162—397)

This invention relates to a machine for automatically moulding under pressure objects from a suspension of fibrous material in a liquid. The machine is particularly suitable for producing hollow objects, for example bottle-like containers, from paper pulp.

Moulding under pressure fibrous material suspended in liquid requires the use of screen moulds and comprises at least three main stages. During the first or preforming stage, suspension is injected into a mould; the fibrous material is deposited on the screen to form a layer of increasing thickness while the excess liquid passes through the screen and is drained off. During the second or consolidation stage, the preformed layer of fibrous material is subjected to a treatment aimed at removing much of the liquid remaining in the layer and to impart to the latter the minimum amount of cohesion that is required to enable the object to withstand subsequent handling. Consolidation is achieved either by compressing the preformed layer or by injecting through the latter a gas which served to pre-dry the fibrous material. The third stage consists in extracting the object from the mould. Once cleaned, the latter can then again be used for a fresh moulding operation.

An object of the invention is to provide a large-scale production machine capable of carrying out in an entirely automatic manner the three above-mentioned stages.

Accordingly, the invention provides a cyclic machine for automatically and repeatedly manufacturing a plurality of hollow moulded objects from a suspension of fibrous material in a liquid, said machine comprising: a central column; a rotatable annular table coaxially mounted around said column; a circularly arranged series of equidistant automatically openable and closable mould means carried by the table and having a cavity therein, said cavity having a screen lining for straining the suspension introduced therein; intermittent drive means for moving said table forward through a predetermined angular distance to bring each mould means to the position occupied by the preceding mould means during the previous pause in the movement of said table; a plurality of units carried by and arranged around said column, each unit including three work stations arranged to cooperate with three mould means during each pause in the movement of said table and adapted to carry out simultaneously three separate operations, the first of said three stations having automatic injection, preforming and dosing means to inject a dose of suspension into the cavity of the first of said three mould means, to preform an object therein by deposition of the fibrous material of the suspension on the screen lining of the cavity of said first mould means, and to measure out a dose of suspension for injection into the mould means next to be moved opposite said first work station by said table, the second of said three stations having automatic compression means to consolidate through compression an object in the cavity of the second of said three mould means preformed by said first work station during the previous pause in the movement of the table, and the third of said three stations having automatic extraction means to extract a moulded object from the third of said three mould means preformed and consolidated by said first and second work stations during the previous two pauses in the movement of the table, automatic transfer means, and automatic rinsing means to clean said third mould means after extraction of the object therein, and endless conveyor means having a portion thereof surrounding said column and cooperating with each transfer means to receive the moulded object extracted from said third mould means.

Figure 2:
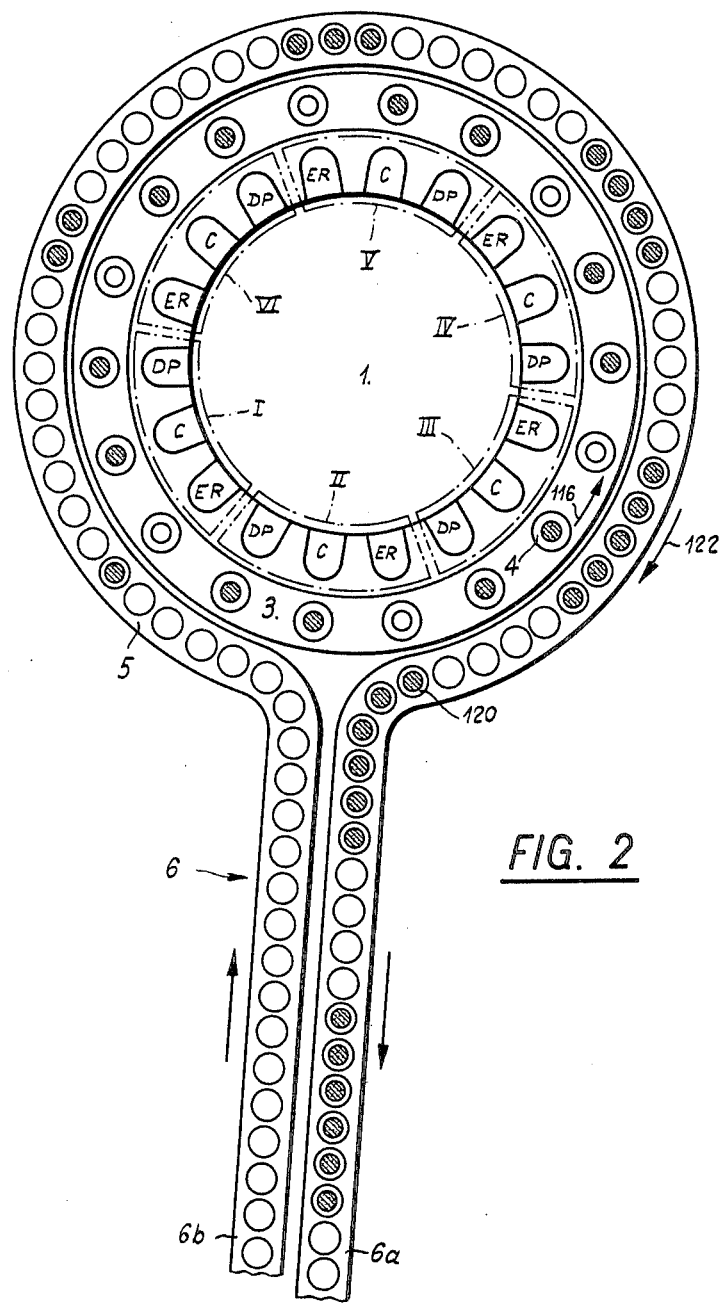

For a better understanding of the invention and to show how the same may be carried into effect, one embodiment thereof will now be described by way of example with reference to the accompanying drawings, in which:

FIGURE 1 is a perspective view of the embodiment, with parts broken away or in section; and FIGURE 2 is a diagrammatic plan view of the embodiment.

Referring to FIGURE 1, the illustrated machine comprises three main parts: a stationary part consisting of a central column 1 mounted on a base 2 and carrying work stations and related components which will be described below; a first mobile part formed by an annular table 3, having a rotational axis coinciding with the axis of column 1, for moving moulds 4 from one work station to the next; and a second mobile part formed by endless conveyor means 5 of which a portion surrounds column 1 and describes a circular path centered on the axis of the column and located at a level lower than that of table 3. The remaining portion of the conveyor means 5, which serves to remove moulded objects away from the machine, describes a loop which is directed radially outwards and of which only the initial part 6 has been shown.

The central column 1 carries a plurality of production units arranged around the column, each unit consisting of three work stations.

Thus, stations 10, 20 and 30 together form a first production unit. Stations 40, 50 and 60 together form a second production unit, and so forth. In the illustrated embodiment, there are six production units of three work stations each. Corresponding stations of each unit are identical and simultaneously carry out during each working cycle of the machine one of the following three operations: preforming, compression, extraction-transfer-rinsing.

The first station of each production unit, for example station 10, carries out the preforming operation and at the same time also measures out a dose of suspension required for a mould. Station 10 consists of twin dosing and injection devices 11a and 11b that are supplied with suspension through ducts 12a and 12b having automatic valves 13a and 13b, and with compressed air through conduits 18a and 18b (the former, which is not visible, corresponding to conduit 41a of station 40 of the second production unit) provided with automatically operated valves 19a and 19b (the former, which is also not visible, corresponding to valve 42a of station 40). The injection devices 11a and 11b are alternately made to communicate with a reciprocable tube 14 by means of an automatic three-way valve not shown, housed in a casing 15. The latter valve and the aforementioned compressed air and suspension supply control valves illustratively are of solenoid operated type responding to any suitable automatic control or controls. The tube 14, which is vertically slidable, is actuated by the rod 16 of a double-acting automatically operated piston and cylinder device 17 such as of a well known fluid-actuated type provided with automatic control for the actuating fluid. At its lower end, the tube 14 is provided with a collar and an injection nozzle, that are not shown in the case of station 10 but which are identical to collar 48 and to injection nozzle 49 of preforming station 40 of the second production unit. The collar and the nozzle are adapted to cooperate with the moulds in a manner that will be described hereafter.

The second station of each production unit, for example station 20, carries out the compression operation and comprises a vertically slidable reciprocable tube 21 operated by a double-acting automatically controlled piston and cylinder device 22. Tube 21 carries at its lower end a collar 23 and an expandable membrane 24 of normally elongated cylindrical shape, both of which are arranged to cooperate with the moulds in a manner that will be explained below. A conduit 21a connects, via an automatically controlled valve (not shown), the tube 21 to a source of fluid under pressure (not shown either) wherewith the expandable membrane 24 may be inflated. The latter mentioned valve may for example be of solenoid operated type having any suitable well known automatic control.

The third station of each production unit, for example station 30, carries out the extraction, transfer and rinsing operation and comprises rinsing means, located above table 3, and extraction means and transfer means, located beneath the table. The rinsing means is formed by a vertically slidable reciprocable tube 31 operated by an automatically controlled piston and cylinder device 32 such as of a suitably automatically controlled fluid operated type. The lower end of this tube carries a collar 33 and a douching nozzle 34 which are adapted to cooperate with the moulds as will be described below. The extraction means includes a double-acting automatically controlled piston and cylinder device 35 having a vertically movable rod 37 which carries at its top end a socket sleeve 37a which cooperates with the bottom portion 111 of the moulds in a manner that will be explained in greater detail below. Device 35 is for example a fluid-operated having any suitable well known control for the actuating fluid. The transfer means includes a handling device formed by an automatically operable holder 36a and secured to the top end of a vertical spindle 36 adapted to rotate automatically about its axis. Synchronizing means of any suitable well known kind, not shown, housed in a casing 39, are provided for synchronising the movements of the removal means with those of the piston and cylinder device of the extraction means.

As previously stated, all production units are identical to the unit described above. All conduits for supplying compressed air to the preforming and dose measuring stations, such as 18b and 41a are connected to a common source which is not visible since it is located inside column 1. All ducts for supplying these same stations with fibrous material suspension, such as 12a and 12b, are connected to a common tank 90 serving as a receptacle filled with such suspension, designated by reference numeral 91. This tank 90 is placed on top of the central column so that the dosing and injection devices, units such as 11a and 11b, of each production may be gravity fed. To preserve the suspension in a homogeneous condition, stirring means are provided. The stirring means consists in the present instance of a rotary arm 92 driven by means housed in a casing 93. Arm 92 carries at its outer end a blade not shown, for continuously stirring the tank contents 91.

The annular rotary table 3 is of U cross-section and is formed by two horizontal plates 3a and 3b spaced by a web 3c. Table 3 is supported by an annular shoulder 3h rigidly mounted on column 1 and lined with an anti-friction bearing ring cooperating with the radially inner edge portion of plate 3b. Moreover, web 3c carries anti-friction bearing rings 3d and 3e which engage in annular runner grooves 3f and 3g formed in column 1. The table 3 is intermittently driven by a motor 100, through the intermediary of a pinion 101, and a toothed crown-wheel 102 on plate 3b. A finger 103, actuated by a double-acting piston and cylinder device 104 secured to column 1, is adapted to project into holes 105 in order accurately to define the stopping positions of table 3 so that the several work stations may cooperate without difficulty with the moulds.

The latter are automatically openable and closable, having screen linings or other previous walls for liquid to permeate and be removed and further having removable bottoms. Other constructional details of these moulds are of no consequence and will therefore not be described; their only relevant feature, for the puropses of the illustrated machine, is that their bottoms must be removable. The bottom 111 of mould 110, shown in axial section in FIGURE 1, is held in position by releasable locking means comprising an internally toothed ring 112 which, upon being rotated about its axis under the action of any suitable known control means, such as including a motor and a timing control connected with the ring for positioning the ring, either releases or blocks retaining splines or teeth on the periphery of the mould bottom. Through the latter extends a downwardly projecting tubular member 113 for draining the liquid flowing through the mould cavity screen during the preforming and rinsing operations, and the liquid oozing through the screen during the compression operation. The liquid discharged during the preforming and compression operations is collected by arcuate receptacles 114 which are in turn drained by pipes 115. These arcuate receptacles extend over an angular distance at least equal to that separating the dose measuring and preforming station from the compression station, each production unit being provided with one of these receptacles. The tubular member 113 is moreover adapted to cooperate with the socket sleeve 37a secured to the top end of the piston rod 37 of each extraction means, forming a part of the third station of the production units, so as to drain the rinsing liquid through hoses, such as 37b, to which the sleeve sockets are connected.

The moulds are equal in number to that of the work stations and are equidistantly spaced from one another around table 3 to form a circular series. Thus, each time table 3 moves forward by one step, in the direction of arrow 116, the moulds are moved from one station to the next, i.e. sequentially from a dose measuring and preforming station to a compression station and thence to an extraction, transfer and rinsing station of successive production units.

The endless conveyor means 5, which, in the present embodiment, is intermittently driven, may be of any known kind. It must at least pass through the points where the transfer means such as 36, 36a release the moulded objects; between these points, the course followed by the conveyor means is immaterial. In the illustrated embodiment, the conveyor means comprises a series of equidistantly spaced plates 120 connected together to form an endless chain. These plates are guided by a rail 121 which causes them to follow a circular path passing around column 1 and prolonged by a loop extending radially away from the machine. This loop, of which only the initial portion 6 is shown, serves to convey the moulded objects towards other apparatus required for finshing the moulded objects, for example drying kilns. The circular portion of the path is concentric with central column 1 and is positioned in a horizontal plane at a level such that the plates will be very slightly below the lowermost positions reached by the mould bottoms for a transfer operation by the handling means. The chain of plates travel in a direction opposite to that of the table, as shown by arrow 122. The movement of the chain is intermittent and is synchronised with that of the table so that the pauses in the movement of the conveyor means coincide with the periods in which the handling means are operated. The pauses last just long enough for the handling means to transfer the moulded objects from the lowered mould bottoms, such as 38, to the plates 120 and to return to their initial rest position. Consequently, the periods during which the conveyor means is in motion are long and the periods during which the conveyor means is stationary are short; whereas in the case of the table, the reverse applies: the pauses are long and the periods during which it is in motion are short.

Since the moulded objects have a smaller cross-section than the moulds, a larger number of plates can be arranged around the machine than moulds. Accordingly, in the illustrated embodiment, there are nine plates between two successive extraction, transfer and rinsing stations, and the distance travelled by the conveyor means between pauses has been chosen to be equal to the distance separating ten plates.

The machine operates as follows.

Each time table 3 stops moving, the work stations carry out the following operations:

*Dose measuring and preforming (e.g. station 10)*

The reciprocatable tube 14 is lowered by the piston and cylinder device 17 to insert its nozzle into the underlying mould, its collar ensuring fluid-tightness.

Supply valve 13b having been closed, the three-way valve in casing 15 is actuated to enable the contents of the dosing and injection device 11b (supposed full) to be discharged into the mould under the action of compressed air admitted by valve 19b; the suspension is strained by the mould screen, and a layer of fibres is deposited thereon, excess liquid flowing through the tubular member 113 in mould bottom 111 into the receptacle 114. Actuation of the three-way valve in casing 15 to discharge device 11b also causes the device 11a to be closed off from the mould. At the same time, valve 13a is opened to refill device 11a with suspension emptied during the previous machine cycle, in readiness for the next work cycle and then closed as soon as the device is full. Upon completion of the preforming operation, the inflow of compressed air is interrupted by closure of valve 19b.

Tube 14 is then raised. The cycle is then completed and the next cycle can begin upon table 3 having moved forward one step.

*Compression (e.g. station 20)*

Reciprocatable tube 21 is lowered to insert into the mould the expandable membrane 24, its collar 23 ensuring fluid-tightness.

Fluid under pressure is admitted into membrane 24 through tube 21; membrane 24 is inflated and compresses the layer of fibres deposited on the mould cavity screen during the previous cycle.

The valve for admitting fluid under pressure is closed and tube 21 is vented to deflate membrane 24.

Tube 21 is then raised thereby withdrawing the deflated membrane 24 from the mould.

*Extraction, removal and rinsing (e.g. station 30)*

Piston rod 37 is raised to fit socket sleeve 37a over the tubular member 113 extending through the mould bottom.

Means 112 for locking the mould bottom 111 is released and the mould opens; mould bottom 111 is lowered together with the moulded object carried thereby, which object comes to occupy position 123 shown in chain-dotted lines.

Spindle 36, which so far was in its rest position, is rotated until holder 36a comes to surround the moulded object, whereupon it comes to a stop; holder 36a grips the moulded object; piston rod 37 is lowered a little more to provide a clearance between the moulded object and the mould bottom; spindle 36 starts rotating again and carries the moulded object to position 124 shown in full lines, and stops.

Holder 36a is opened to deposit object 124 on to plate 120; conveyor means 5 is set in motion; rod 37 is raised and maintains mould bottom 38 at a slight distance from its uppermost position.

Spindle 36 continues rotation until it returns, after having completed one full revolution, to its rest position; tube 31 is lowered to insert douching nozzle 34 into the mould, its collar 33 ensuring fluid-tightness, and rinsing liquid is admitted into the mould. The rinsing water, which flows through the tubular member extending through the mould bottom is drained off by hose 37b.

The admission of rinsing liquid is stopped, rod 37 is raised further to press bottom 38 against the mould walls to close the mould, the locking means is actuated to lock the mould bottom, and rod 37 is again lowered to disengage socket sleeve 37a from the tubular member extending through the mould bottom.

The same operations are carried out simultaneously in each production unit, all of the moulds being successively brought into register with each work station by table 3.

The loading of the endless conveyor means 5 takes place in the manner illustrated in FIGURE 2. FIGURE 2 shows the central column 1 carrying eighteen work stations, grouped into six production units marked off by chain-dotted lines, the rotary table 3, the endless conveyor means 5 and the initial portion 6 of its radial loop. The work stations are identified by the letters DP (dose measuring-preforming), C (compression forming) and ER (extraction, transfer and rinsing), while the production units are referenced by Roman numerals I to VI. The moulds that are in register with stations ER are shown empty and the corresponding plates are shown occupied; FIGURE 2 thus illustrates the situation at the end of a work cycle. For the next work cycle, the conveyor means will have advanced to the extent of ten plates, so that the unoccupied plates immediately following the plates last loaded will be brought opposite the stations ER. The conveyor means will thus be progressively loaded as it moves forward step by step; upon moving away from the machine, the load of the conveyor means will be made up, in this particular instance, of groups of six occupied plates separated by groups of four free plates (see member 6a of the initial portion 6 of the radial loop). The distribution of free and occupied plates, when conveyor means 5 leaves the machine, obviously depends on the number of production units with which the machine is provided, on the number of plates per production unit and on the distance travelled forward by the conveyor means per work cycle. It will now be shown that two conditions must be satisfied in order for a free plate always to come to rest opposite each transfer station.

If U is the number of production units, $k$ the number of plates per production unit, i.e. the number of plates between two successive ER stations, and A the distance travelled forward by the conveyor means per work cycle, reckoned in terms of number of plates, the above two conditions may be expressed by the formulas:

(1) $$A \geq U$$

(2) $$L.C.M. (A, k) \geq kU$$

where L.C.M. (A, $k$) stands for the least common multiple between A and $k$.

Consequently, the numbers chosen for the illustrated machine, i.e. $U=6$, $k=9$ and $A=10$, only represent one possibility among several. The selected possibility entails having incompletely loaded conveyor means when the latter leaves the machine, i.e. six occupied plates followed by four free plates. This partial utilization of the conveyor means is governed by other incidental operational conditions, which will not be gone into here. If it were desired to make maximum use of the conveyor means in the case of the illustrated embodiment where $U=6$ and $k=9$, the conveyor means shoud move forward to the extent of 7 plates per cycle. This would leave only one unoccupied plate between two series of six loaded plates. In this instance, where $U=6$ and $k=9$, a 100 percent utilization of the conveyor means is made impossible by condition (2) above.

In the case of conveyor means 5, where there are always six occupied plates followed by four free plates leaving the machine, the free plates are not necessarily always the same ones. Should conveyor means 5 comprise a number of plates which is a multiple of ten, then it is always the same plates that are free. These plates would therefore be otiose and could be dispensed with thereby simplifying the construction of the conveyor means without however altering its length. This possibility will always exist whenever the number of plates of the conveyor means is a multiple of the number of plates by which it advances at each step.

By way of modification it would be quite feasible to drive the conveyor means continuously. In such a case, the kinematics of the movement of the various transfer means would have to be such that the conveyor means and the moulded objects about to be released thereon move at equal speeds in order to be relatively stationary. Moreover, means have to be provided for strictly synchronising the continuous forward movement of the conveyor means and the discontinuous forward movement of the rotary table of the machine, otherwise the moulded objects are likely to be deposited by the transfer means between two plates.

The transfer means could operate otherwise than described. For example, instead of spindle 36 causing holder 36a to carry out a full revolution at each cycle, the holder 36a could, in the case of discontinuously moving conveyor means, move back to its rest position once it has released a moulded object: holder 36a would thus carry out a to and fro movement, but the raising of mould bottom 38 would have to be delayed until the transfer means has returned to its rest position. Another possibility would be that the moulded objects, instead of being gripped sideways as described, could be gripped from above. Furthermore, any kind of holding means suitable for gripping soft objects could be resorted to.

The direction of movement of the conveyor means in relation to the table is immaterial: this movement could equally well be in the same direction as the movement of the table, or in the opposite direction, as is the case in the illustrated embodiment.

In the machine described by way of example, there is only one mould opposite each work station and each mould has a single cavity. It is possible to have a machine of increased output by resorting to multi-cavity moulds or by having a group of several moulds opposite each work station, which moulds could be formed with either a single cavity or a plurality of cavities. The components of each work station would then have to be suitably adapted. Consequently, at the dose-measuring and preforming stations, the reciprocatable tubes, such as 14, would be provided with several collars, such as 48, and with several nozzles, such as 49, the number of such collars and nozzles per tube corresponding to the number of cavities comprised by each mould or group of moulds, and the capacity of the dosing and injection devices, e.g. 11a and 11b, would be adapted to satisfy the increased amount of suspension required for each cycle of operations.

Similarly, at the compression stations, the sliding tubes, such as 21, would each be provided with a plurality of expandable membranes. At the extraction, transfer and rinsing stations, the sliding tubes, such as 31, would carry a plurality of douching nozzles; the transfer means would be provided with a plurality of holders, which holders should be able, when required, to alter the relative position of the extracted objects in relation to the position they occupied inside the moulds in order to place them on the conveyor means in a more compact manner. Such a multiple cavity and/or multiple mould arrangement thus could substantially increase the output of the machine but entails a more complex mechanical structure.

The described machines make it possible to achieve large-scale production of hollow objects manufactured by moulding under pressure a suspension of fibrous material. moreover, the use of endless conveyor means for removing the moulded objects increases the adaptability of the machine when it is required to cooperate with other apparatus, in particular the apparatus used for finishing the moulded objects.

Furthermore, since the several work stations operate in parallel, the described machines have the advantage that should one of their work stations break down, the remaining work stations are not put out of action: only the objects from the production unit comprising the faulty work station must be discarded. The machine will continue to operate despite the breakdown and the output of the other units will not be affected.

I claim:

1. A machine for automatically and repeatedly manufacturing a plurality of hollow moulded objects from a suspension of fibrous material in a liquid, said machine comprising: a plurality of openable and closable similar mould means mounted and arranged to be moved to have after each of intermittent advancements the position occupied by the preceding mould means, each of said plurality of mould means having at least one cavity and pervious wall means for retaining a fibrous material in said cavity and for a liquid to permeate from said cavity; intermittent drive means operably connected with said plurality of mould means and made for each operation to step advance each mould means into pause in the position occupied by the preceding mould means during the previous pause in the advance of said plurality of mould means; and a plurality of units each including first, second and third work stations disposed and arranged to cooperate respectively with first, second and third said mould means during each pause in the advance of said plurality of mould means and carry out simultaneously separate operations, said first work station having automatic injection, preforming and dosing means to inject a dose of suspension into the cavity of said first mould means, to preform an object therein by depositing the wet fibrous material of the suspension on the pervious wall means of said first mould means, and to measure out a dose of suspension for injection into the mould means next to be moved opposite said first work station by said intermittent drive means, said second work station having automatic inflatable compressing means arranged to extend retractably into the cavity of said second mould means and be inflated to consolidate through compression an object of the fibrous material preformed in the cavity of said second mould means by said first work station during the previous pause in the operation of said intermittent drive means, and said third work station having automatic extraction means to extract from said third mould means a moulded object preformed and consolidated by said first and second work stations during the previous two pauses in the operation of said intermittent drive means.

2. A machine as claimed in claim 1, wherein said plurality of mould means are components of a carrier and said carrier is mounted to be moved and is operably interconnected with said intermittent drive means for advancing said plurality of mould means intermittently circuitously.

3. A machine as claimed in claim 1, wherein each of said third work stations further has automatic transfer means for transferring a moulded object from said extraction means for the moulded object transferred to be conveyed.

4. A machine as claimed in claim 3, wherein each of said series of automatically openable and closable mould means includes a body; a bottom portion removable from the body and having a tubular member extending to drain liquid from the mould means, said body and bottom portion having automatically operated locking means for normally locking the bottom portion in the body and, when the mould means is opposite the third work station of each unit, for temporarily releasing said bottom portion to extract a moulded object from the mould means.

5. A machine as claimed in claim 4, wherein each of said third work stations further has automatic rinsing means to clean said third mould means after said extraction means has extracted a moulded object from said third mould means, said tubular member of each mould means has a portion projecting downwardly from said bottom portion, and said extraction means includes an automatically controlled piston and cylinder device having an upwardly directed and vertically movable piston rod carrying socket means for engaging said projecting portion of the tubular member, the piston and cylinder device being arranged to raise the socket means from a waiting position to an uppermost position thereby to engage the socket means over the projecting portion of the tubular member of said third mould means, to move the socket means together with the mould bottom portion and a moulded object carried thereby from said uppermost position to a low position, to hold the socket means in said low position to enable said moulded object to be gripped by the automatic transfer means, to move the socket means together with the mould bottom portion from said low positions to a lower position to disengage the mould bottom portion from the gripped moulded object before the latter is transferred by the transfer means, to move the socket means together with the unloaded mould bottom portion from said lower position to an intermediate position near said uppermost position to enable said third mould means to be cleaned by the automatic rinsing means, to move the socket means from said intermediate position to said uppermost position thereby to return the cleaned mould bottom portion back in place in the mould body portion, and to lower the socket means back to said waiting position, said automatically operated locking means unlocking the mould bottom portion when the socket means first reaches said uppermost position and locking the mould bottom portion in the mould body portion when the socket means reaches said uppermost position the second time.

6. A machine as claimed in claim 3, wherein said automatic transfer means includes holding means for releasably gripping a moulded object, said holding means arranged to occupy a rest position, a position in which a moulded object extracted by said extraction means from said third mould means can be gripped, and a position in which a gripped object can be deposited for the deposited object to be conveyed.

7. A machine as claimed in claim 1, wherein each of said third work stations further has automatic rinsing means to clean said third mould means after said extraction means has extracted a moulded object from said third mould means.

8. A machine as claimed in claim 7, wherein said rinsing means includes an automatically controlled device having douching nozzle means arranged to be sealingly inserted by the device into the cavity of said third mould means at a given instant of the pause in the operation of said intermittent drive means and be extracted by the device near the end of the pause in the operation of said intermittent drive means, and said automatically controlled device being in combination with automatically operated valve means arranged to admit rinsing liquid to said douching nozzle means while said douching nozzle means is sealingly inserted in the mould cavity thus to clean said third mould means and to interrupt the admission of rinsing liquid to the douching nozzle means befor the douching nozzle means is moved to the retracted position by operation of said automatically controlled device.

9. A machine as claimed in claim 1, wherein said automatic injection, preforming and dosing means includes a pair of alternately operable dosing devices; reciprocatable tube means alternately communicatable at one end with the dosing devices and having nozzle means at the other end arranged to be sealingly inserted into said first mould means; an automatically controlled piston and cylinder device for moving the tube means and the nozzle means from a retracted position to an operative position thereby to insert the nozzle means into said first mould means at the beginning of a pause in the operation of said intermittent drive means and for moving the tube means and the nozzle means back to said retracted position near the end of the pause in the movement of said intermittent drive means; and automatically operated valve means having components arranged respectively to establish communication between the tube means and selectively one of the dosing devices, to admit compressed gas into said one dosing device thereby to inject the contents thereof through the tube means and the nozzle means into the cavity of said first mould means and to preform the fibrous material of the injected suspension in said cavity, to stop the admission of said compressed gas before said tube means and nozzle means are moved back to said retracted position, to admit suspension into the other dosing device thereby to prepare a dose for the mould means next to be moved opposite said first work station, and to interrupt the admission of compressed gas and suspension to the dosing devices.

10. A machine as claimed in claim 1, wherein said automatic inflatable compressing means includes reciprocatable diaphragm means arranged to be inserted into the cavity of said second mould means and thereafter to be inflated; an automatically controlled piston and cylinder device connected with the diaphragm means for moving the diaphragm means into said cavity when said intermittent drive means comes to pause and for moving the diaphragm means back to a retracted position near the end of the pause in the movement of said intermittent drive means; and automatically operated valve means arranged to admit fluid under pressure into the diaphragm means to expand the latter into contact with the walls of the preformed object in said second mould means thereby to apply consolidation pressure, and thereafter to exhaust the diaphragm means.

11. A machine as claimed in claim 1, wherein each mould means includes a plurality of moulds, each mould having one cavity.

12. A machine as claimed in claim 1, wherein each mould means includes one mould having a plurality of cavities.

13. A machine as claimed in claim 1, wherein each mould means includes a plurality of moulds, each mould having a plurality of cavities.

14. A cyclic machine for automatically and repeatedly manufacturing a plurality of hollow moulded objects from a suspension of fibrous material in a liquid, said machine comprising: a central column; rotatable annular table surrounding said column and mounted on said column; a circularly arranged series of openable and closable similar mould means carried by the table for each mould means to have after each of angular advancements of the table the position occupied by the preceding mould means, said series of mould means each having at least one cavity and pervious wall means for retaining a fibrous material in said cavity and for liquid to permeate from said cavity; intermittent drive means connected for advancing said table angularly and made for each operation to step advance each mould means into pause in the position occupied by the preceding mould means during the previous pause in the movement of said table; and a plurality of similar units disposed adjacent to said table, each unit including first, second and third work stations arranged to cooperate respectively with first, second and third said mould means during each pause in the movement of said table and carry out simultaneously separate operations, said first work station having automatic injection, preforming and dosing means to inject a dose of suspension into the cavity of said first mould means, to preform an object therein by depositing the wet fibrous material of the suspension on the pervious wall means of said first mould means, and to measure out a dose of suspension for injection into the mould means next to be moved opposite said first work station by said table, said second work station having automatic inflatable compressing means arranged to extent retractably into the cavity of said second mould means and be inflated to consolidate through compression an object of the fibrous material preformed in the cavity of said second mould means by said first work station during the previous pause in the movement of the table, and said third work station having automatic extraction means to extract from said third mould means a moulded object preformed and consolidated by said first and second work stations during the previous two pauses in the movement of the table.

15. A machine as claimed in claim 14, wherein said column extends above said table and supports a receptacle above said dosing devices and said receptacle is interconnected with said dosing devices to gravity feed a moulding material in suspension in liquid to the latter.

16. A machine as claimed in claim 14, wherein automatically operated locking means extending between the table and the column is arranged for accurately locating said series of mould means opposite the work stations of said units each time the table comes to a stop and for freeing the table at the end of each pause.

17. A machine as claimed in claim 14, wherein each of said third work stations further has automatic transfer means for transferring a moulded object from said extraction means for the moulded object transferred to be conveyed, and automatic rinsing means to clean said third mould means after said extraction means has extracted a moulded object from said third mould means; and the machine further including endless conveyor means extending around said column and cooperating with each said transfer means to receive and convey a moulded object transferred by said transfer means.

18. A machine as claimed in claim 17, wherein said conveyor means includes a series of spaced plates for carrying the moulded objects.

References Cited by the Examiner
UNITED STATES PATENTS

| | | | |
|---|---|---|---|
| 1,966,471 | 7/1934 | Walters | 162—392 |
| 2,131,813 | 10/1938 | Marguerat et al. | 162—410 |
| 2,514,486 | 7/1950 | Green | 18—5 |
| 3,112,521 | 12/1963 | Ward | 18—5 |

DONALL H. SYLVESTER, *Primary Examiner.*

J. H. NEWSOME, *Assistant Examiner.*